(12) United States Patent
Rees

(10) Patent No.: US 9,580,020 B1
(45) Date of Patent: Feb. 28, 2017

(54) SIDE RAIL STEP

(71) Applicant: Mark E. Rees, Naugatuck, CT (US)

(72) Inventor: Mark E. Rees, Naugatuck, CT (US)

( * ) Notice: Subject to any disclaimer, the term of this patent is extended or adjusted under 35 U.S.C. 154(b) by 0 days.

(21) Appl. No.: 14/968,206

(22) Filed: Dec. 14, 2015

Related U.S. Application Data

(60) Provisional application No. 62/090,999, filed on Dec. 12, 2014.

(51) Int. Cl.
  *B60R 3/00* (2006.01)
(52) U.S. Cl.
  CPC .............. *B60R 3/007* (2013.01); *B60R 3/002* (2013.01)
(58) Field of Classification Search
  CPC .................................. B60R 3/02; B60R 3/002
  USPC .................................................. 280/163, 166
  See application file for complete search history.

(56) References Cited

U.S. PATENT DOCUMENTS

| | | | | |
|---|---|---|---|---|
| 1,679,796 A * | 8/1928 | Spiro | ...................... | B60R 3/002 280/163 |
| 3,159,242 A | 12/1964 | James | | |
| 3,357,719 A | 12/1967 | McCrea | | |
| 4,089,276 A | 5/1978 | Enos | | |
| 4,266,817 A * | 5/1981 | Mason | .................... | B60R 19/48 280/164.1 |
| D263,132 S | 2/1982 | Mitchell | | |
| 4,405,141 A | 9/1983 | Jurek | | |
| 4,753,447 A | 6/1988 | Hall | | |
| 4,982,974 A * | 1/1991 | Guidry | ...................... | B60R 3/02 182/91 |
| 5,193,829 A * | 3/1993 | Holloway | ............... | B60R 3/007 280/163 |
| 5,364,142 A * | 11/1994 | Coiner | .................... | B60R 19/52 293/106 |
| 5,501,475 A * | 3/1996 | Bundy | ...................... | B60R 3/00 182/127 |
| 5,601,300 A * | 2/1997 | Fink | ........................ | B60R 3/002 280/166 |
| 5,697,626 A * | 12/1997 | McDaniel | ................. | B60R 3/02 182/91 |
| 5,823,585 A * | 10/1998 | Tanguay | ................. | B60R 19/48 293/106 |
| 5,895,064 A * | 4/1999 | Laubach | ................. | B60R 3/002 248/205.1 |
| 6,170,842 B1 | 1/2001 | Mueller | | |
| 6,173,979 B1 * | 1/2001 | Bernard | .................. | B60R 3/002 280/163 |
| 6,682,086 B1 * | 1/2004 | Erickson | ................... | B60R 3/02 280/163 |
| 6,742,793 B2 * | 6/2004 | Henriksen | ............... | B60R 3/002 280/163 |

(Continued)

OTHER PUBLICATIONS https://web.archive.org/web/20090131083238/http://oneupoffroad.com/ouoproducts/oneupsteps.html (Jan. 31, 2009).*

*Primary Examiner* — J. Allen Shriver, II
*Assistant Examiner* — Brian Cassidy
(74) *Attorney, Agent, or Firm* — Robert C. Montgomery; Montgomery Patent & Design LP

(57) ABSTRACT

A step-up side rail system is designed to be attached to at least one (1) side frame of a pickup truck, or other similar large vehicle. The device provides a measure of protection from incidental contact while acting as step by which access to the cab, or other nearby portions of the vehicle, may be gained. The device is configured to accommodate a variety of vehicles and step widths.

14 Claims, 5 Drawing Sheets

(56) References Cited

U.S. PATENT DOCUMENTS

| | | | |
|---|---|---|---|
| 6,769,704 B2 * | 8/2004 | Cipolla | B60R 3/007 224/521 |
| 6,955,370 B2 * | 10/2005 | Fabiano | B60R 3/02 280/163 |
| 7,318,596 B2 * | 1/2008 | Scheuring, III | B60R 3/02 280/163 |
| 7,448,637 B2 | 11/2008 | Parker | |
| 7,455,307 B2 * | 11/2008 | Seely | B60R 3/007 182/150 |
| 7,637,524 B2 * | 12/2009 | Schuettenberg | B60D 1/00 280/402 |
| 7,823,896 B2 * | 11/2010 | VanBelle | B60R 3/02 280/163 |
| 8,833,781 B2 * | 9/2014 | Hayes | B60R 3/02 280/163 |
| 9,168,872 B1 * | 10/2015 | Glovak | B60R 3/002 |
| 9,260,069 B2 * | 2/2016 | Okuda | B60R 19/34 |
| 2004/0004339 A1 * | 1/2004 | Fichter | B60R 3/00 280/164.1 |
| 2005/0212249 A1 * | 9/2005 | Lopez | B60R 3/007 280/164.1 |
| 2006/0082095 A1 * | 4/2006 | Knittel | B60R 3/007 280/163 |
| 2006/0091637 A1 * | 5/2006 | Knittel | B60Q 1/323 280/163 |
| 2008/0116652 A1 * | 5/2008 | Storer | B60R 3/00 280/164.1 |
| 2010/0194070 A1 * | 8/2010 | Stauffer | B60R 3/002 280/166 |
| 2016/0031376 A1 * | 2/2016 | Stickles | B60R 3/02 280/166 |
| 2016/0096478 A1 * | 4/2016 | Reynolds | B60R 9/02 280/834 |

* cited by examiner

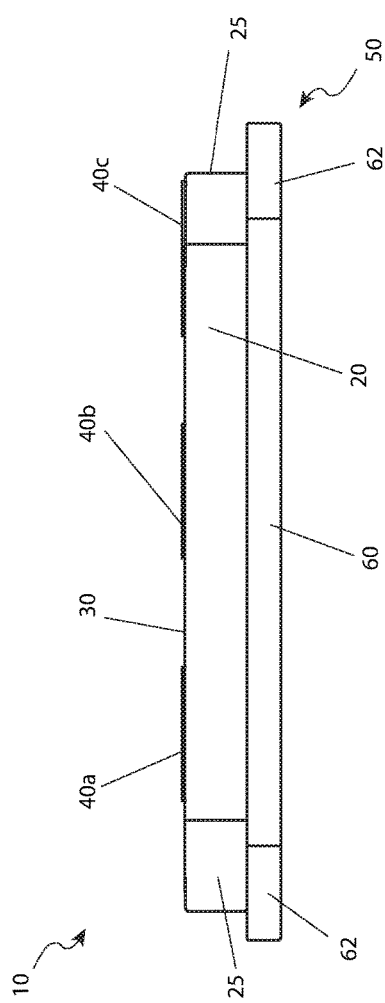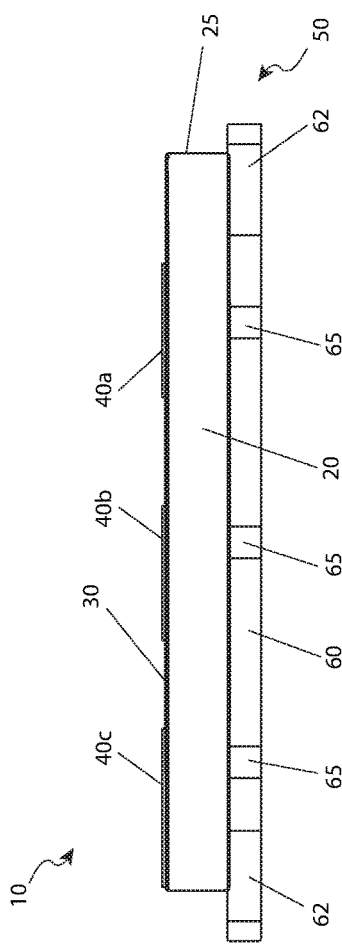

SIDE RAIL STEP

RELATED APPLICATIONS

The present invention is a continuation of, was first described in, and claims the benefit of U.S. Provisional Application No. 62/090,999, filed Dec. 12, 2014, the entire disclosures of which are incorporated herein by reference.

FIELD OF THE INVENTION

The present invention relates generally to a step-up assembly designed to attach to a side rail of a vehicle.

BACKGROUND OF THE INVENTION

With sales at an all-time high, the popularity of the pick-up style truck as an everyday vehicle is more wide spread than it ever has been. Their utility and convenience in hauling items coupled with the availability of luxury interiors and extended cab space have made the pickup a popular alternative to other vehicles. The availability of aftermarket accessories also enhances the attractiveness of pickup trucks as well. Several of these aftermarket products, such as hitch steps, bumper platforms, and running boards, are designed to improve access to various interior and exterior areas on the vehicle. While they do their job fairly well, they are very utilitarian in appearance, and even tend to detract from the appearance of the vehicle. Accordingly, there exists a need for a means by which a step-up assembly can be provided with an enhanced visual appearance. The use of the system provides access to all points of a motor vehicle in a manner which is not only quick, easy, and effective, but stylish as well.

SUMMARY OF THE INVENTION

It is therefore an object of the present invention to provide such a step that is capable of being removably attached to a side of a vehicle. The step comprises a frame assembly, a block having a bottom surface attached to the frame assembly, and at least one (1) step plate affixed to an upper surface of the block.

Another object of the present invention is to provide such a frame assembly including a main frame member and at least one (1) secondary frame member. Each of the secondary frame members are attached perpendicularly to the rear face of the main frame member. Each secondary frame member is configured to be attached to the side of the vehicle.

Another object of the present invention is to provide where the front face of the main frame member has a profile matching that of the front face of the block. In a preferred embodiment, the front face of both the main frame member and the block has a linear portion and a pair of distal end portions. The distal end portion each deflect rearwardly from the linear portion at an angle. A preferred angle is forty-five degrees (45°).

Another object is to provide such a block that is a hardwood.

Yet another object is to provide such a step plate, or a plurality of step plates with intervening gaps, that has a general overall configuration matching that of the upper surface of the block. In various embodiments, the step plate is either a diamond plate or a four-way safety plate.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 3 is front elevation view of the side rail 10 in accordance with the preferred embodiment of the present invention;

FIG. 4 is a rear elevation view of the side rail 10 in accordance with the preferred embodiment of the present invention;

DESCRIPTIVE KEY

Figure 1:
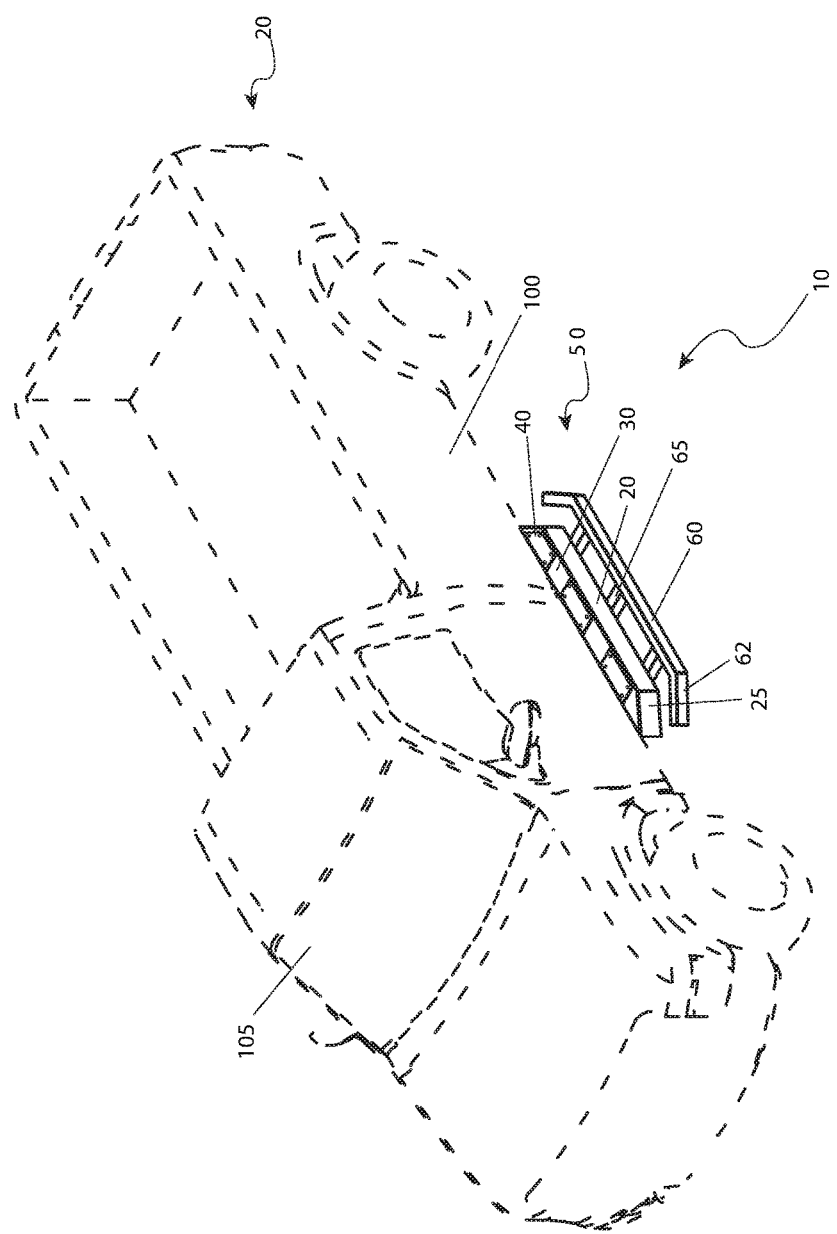
FIG. 1 is an environmental perspective view of a side rail 10 in accordance with the preferred embodiment of the present invention, showing a first step plate 40*a*, a second step plate 40*b*, and a third step plate 40*c*.

10 side rail
20 block
25 block end face
30 ledge
40*a* first step plate
40*b* second step plate
40*c* third step plate
45 plate fastener aperture
46 frame fastener aperture
50 frame assembly
60 main frame member
62 main frame member block face
65 secondary frame member
70 unitary step plate
100 vehicle
105 vehicle cab

DETAILED DESCRIPTION OF THE PREFERRED EMBODIMENT

Figure 2:
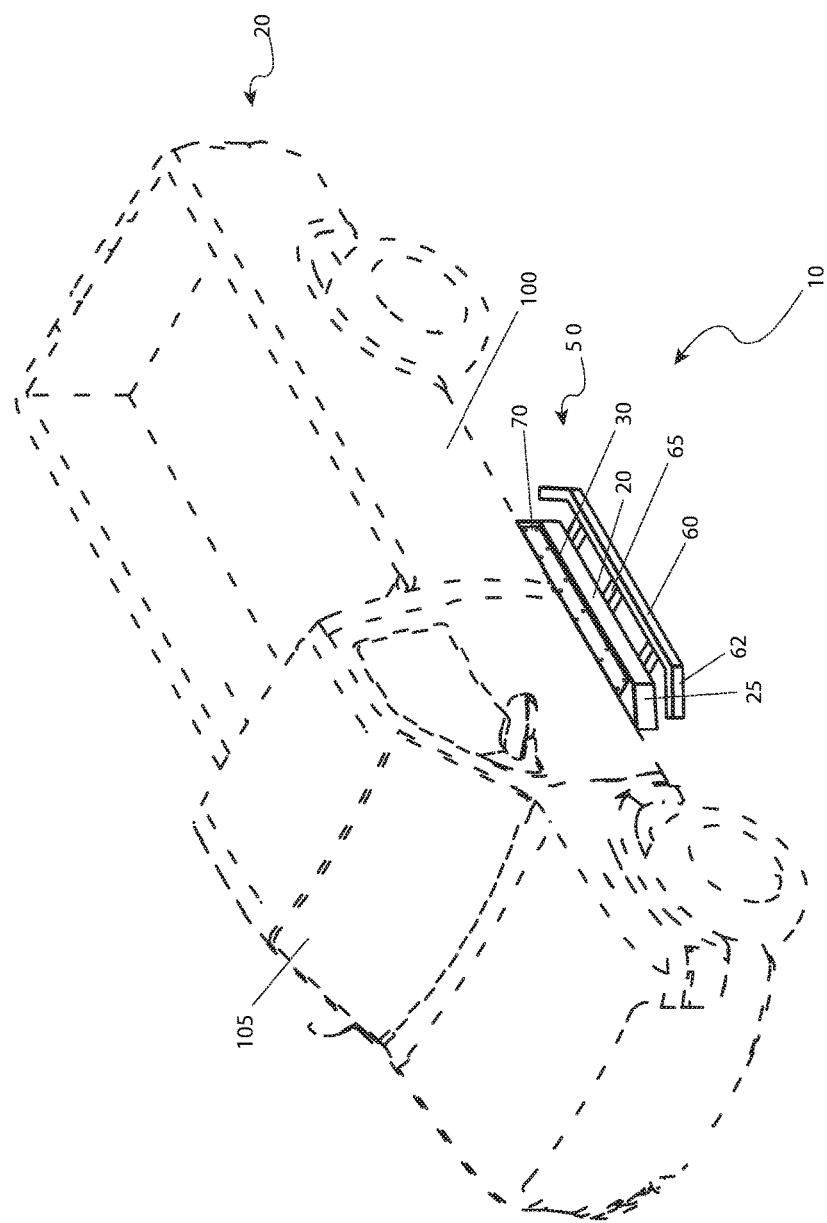
FIG. 2 is an environmental perspective view of the side rail 10 in accordance with an alternate embodiment of the present invention, showing a unitary step plate 70.
Figure 5:
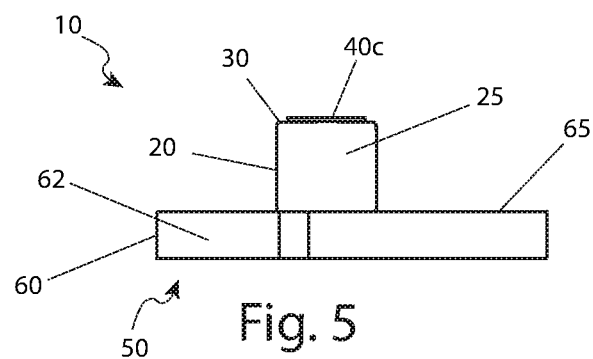
FIG. 5 is a first side elevation view of the side rail 10 in accordance with the preferred embodiment of the present invention.
Figure 6:
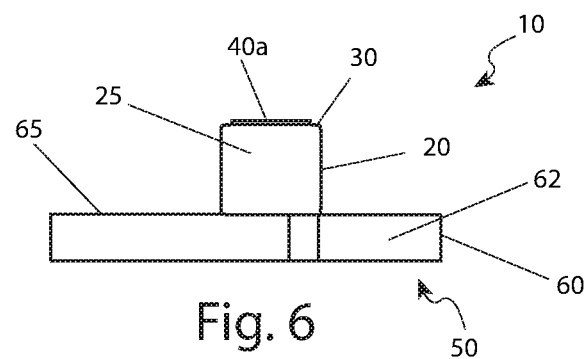
FIG. 6 is an opposite side elevation view of the side rail 10 in accordance with the preferred embodiment of the present invention.
Figure 7:
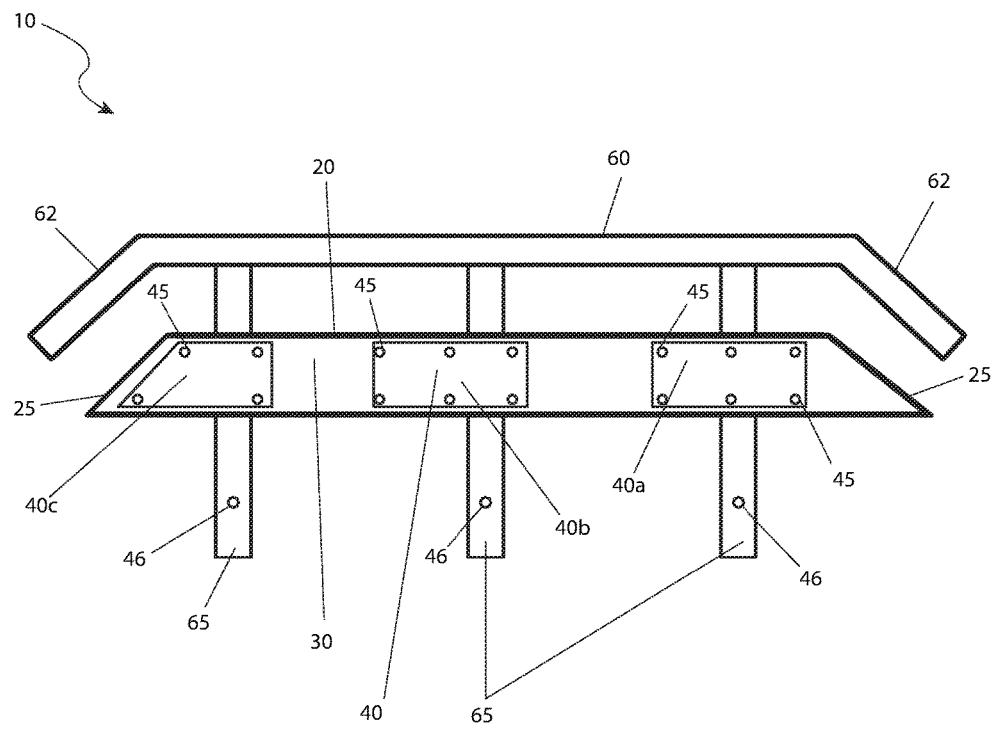
FIG. 7 is top plan view of the side rail 10, in accordance with the preferred embodiment of the present invention; and, FIG. 8 is a bottom plan view of the side rail 10, from another perspective, in accordance with the preferred embodiment of the present invention.

The best mode for carrying out the invention is presented in terms of its preferred embodiment, herein depicted within FIGS. 1 and 3-8. An alternate embodiment is shown in FIG. 2. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a step-up side rail (herein referred to as the "system") 10, which primarily provides a ledge 30 composed of a hardwood block 20 capable of supporting a user's weight, at a side of a vehicle 100. The user may more easily be able to gain access to the vehicle cab 105 or other elevated portions of that vehicle 100. The ledge 30 may also serve other utility purposes, such as, but not limited to, a seating area, or a cargo-carrying platform. Due to the outboard positioning of various segments, the system 10 may also serve as a deflector of incidental contact for the vehicle 100. It is understood that while the accompanying illustrations depict the system 10 as being located on an operator's side of the vehicle 100, a similar device 10 may be located on an opposite side of that same vehicle 100 and would generally be a mirror image. The terms "front" and "back" or "rear" are used consistent with the front and back/rear directions of the vehicle 100 to which the system 10 may be attached.

Figure 8:
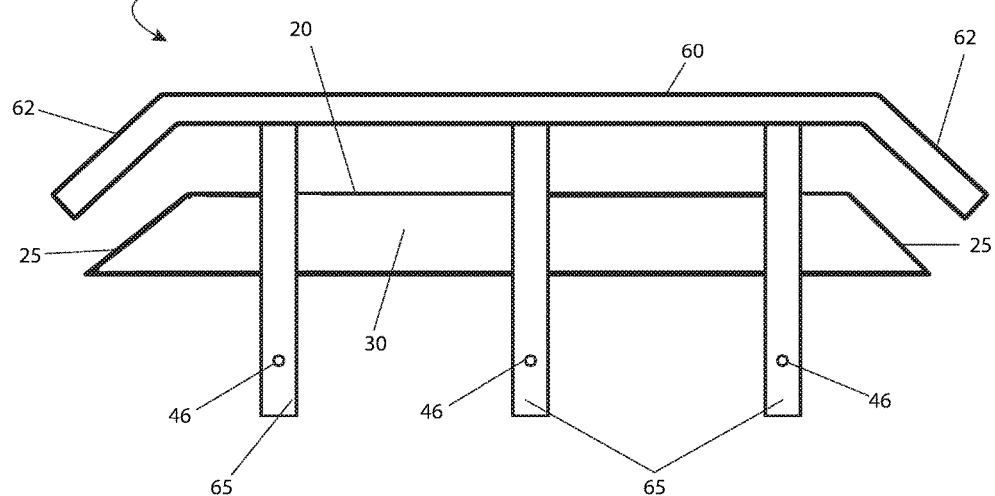

Referring now to FIGS. 1 and 3-8, major projection views, and FIGS. 8 and 9, isometric views, from different perspectives, of the system 10, according to the preferred embodiment of the present invention, are disclosed. The system 10 includes a frame assembly 50, to be attached to a side of a vehicle 100, and a block 20. The frame 55 is composed of a main frame member 60 and a plurality of secondary frame members 65 bolted, or otherwise fastened, together to support the block 20 and affix the system 10 to the frame of the vehicle 100. This attachment is achieved through the use of threaded frame fasteners (not shown) securing the secondary frame members 65 to apertures (not shown) drilled into, or through, the appropriate frame members of the vehicle 100 in cooperation with included nuts. It is envisioned that the installation of this frame assembly 50 will be performed by a skilled tradesman qualified to perform such services. The frame members 60, 65 are preferably composed of UNISTRUT®; however, other steel strut material, or structural steel tubing, may be utilized without limiting the scope of the system 10.

The frame assembly 50 incorporates a main frame member 60 located on a distal side of the block 20. This main frame member 60 is attached to the secondary frame members 65 at locations subjacent to the block 20, such that the secondary frame members 70 extend perpendicularly away from the main frame member 60. The main frame member 60 is adapted to comply with the plan profile of the block 20. That is, if the block end faces 25 are perpendicular to the longitudinal axis of the block 20, then the main frame member 60 will be linear, terminating in proximity to those block end faces 25. In other embodiments in which the block end faces 25 are configured to be other than perpendicular to the longitudinal axis of the block 20, the first frame member 65 will be tailored to comply with that adaptation. In the case of the preferred embodiment, the main frame member 60 has a linear section, and two (2) main frame member block faces 62 at the distal ends, which are angled in a generally identical angle as the block end faces 25 of the block 20 (as described below).

The block 20 is configured to be a rectangular polyhedron composed of any of a variety of hardwoods typically utilized for wooden support structures. The block 20 may be rough-hewn, or planed and sanded, with any type of coating, or treatment, to inhibit deterioration and provide aesthetic appeal as may suit the taste of a particular user. The wooden block 20 preferably has a cross-sectional size of nominally four inches (4 in.) high by four inches (4 in.) thick. It is understood that other nominal sizes may be accommodated in any other embodiment without limiting the scope of the system 10. The block 20 is attached to the upper surfaces of some or all of the secondary frame members 70. The block end faces 25 may not be perpendicular to the longitudinal axis of the block 20 in all embodiments. In a preferred embodiment, the block end faces 25 are formed at an approximate forty-five degree (45°) angle to an outer face.

An upper surface of the block 20 is a horizontal plane generally referred to as a ledge 30. The ledge 30 may be provided with at least one (1) step plate 40a, 40b, 40c, 70 to improve traction on the ledge 30. Each step plate 40a, 40b, 40c, 70 may be diamond plate or four-way safety plate in order to achieve this improved traction. The step plate 70 may be disposed upon the ledge 30 as a single piece as is shown in FIG. 2, or may alternately be divided into a plurality of step plates 40a, 40b, 40c, as in a preferred embodiment spaced over the surface of the ledge 30 in some manner. A first step plate 40a is located just near a first side of the ledge 30. A second step plate 40b is generally located near the center of the ledge 30. Both the first and second step plates 40a, 40b are envisioned to be generally rectangular in shape. The third step plate 40c is a shaped as a parallelogram or a triangle and is situated adjacent the opposing second end of the ledge 30 and encompasses the wedge shape formed when the block 20 transitions to the block end face 25. This location is typically on the rear side of the door of the vehicle cab 105. The unitary step plate 70 is envisioned as encompassing the same area as all three (3) step plates 40a, 40b, and 40 plus all the gaps therein. Each step plate 40a, 40b, 40c, 70 is attached to the ledge 30 by means of a fastener passing through one (1) of a plurality of plate fastener apertures 45 aligned with the apertures (not shown) of the ledge 30. The system 10 may be adapted to span any portion of the front of the vehicle 100 so long as a sufficient number of frame members 70 are attached to the frame of the vehicle 100 to support the anticipated loads placed thereupon.

The preferred embodiment of the present invention can be utilized by the enabled user in a simple and straightforward manner with little or no training. After initial purchase or acquisition of the system 10, it would be installed as indicated either in FIG. 1 or 2. The method of installing and utilizing the system 10 may be achieved by performing the following steps: acquiring a model of the system 10 having a desired style to suit the taste of a user; having the frame assembly 50 installed by a qualified provider of such services; utilizing the ledge 30 to access a desired portion of the vehicle 100 by stepping onto and standing upon the ledge 30. The ledge 30 may also be utilized as a seat, or as a horizontal support for other selected items. The system 10 may provide some damage reduction benefit to the vehicle 100 in an entirely passive manner.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A removably attachable step, comprising:
   a frame assembly, comprising:
      a main frame member; and,
      a plurality of secondary frame members, each having a first end perpendicularly attached to a rear side of said main frame member;
   a block, having a bottom surface removably attached to said frame assembly, an upper surface, a front face, and a rear face; and,
   a plurality of step plates, each attached to said upper surface of said block;
   wherein each secondary frame member is adapted to be attached to said side of said vehicle;
   wherein said block bottom surface is attached to top surfaces of at least one of said plurality of secondary frame members; and,
   wherein a front face of said main frame member has a profile matching that of said block front face, each comprising a linear portion and a pair of distal portions, each distal portion deflecting rearwardly away from a respective side of said linear portion at an angle.

2. The step of claim 1, wherein said block is composed of a hardwood.

3. The step of claim 1, wherein said angle is forty-five degrees.

4. The step of claim 1, wherein said block is composed of a hardwood.

5. The step of claim 1, wherein each step plate is a diamond plate or a four-way safety plate.

6. The step of claim 1, wherein said plurality of step plates and gaps therebetween are configured to generally match a profile of said block upper surface.

7. The step of claim 6, wherein each step plate is a diamond plate or a four-way safety plate.

8. A removably attachable step, comprising:
   a frame assembly, comprising:
      a main frame member; and,
      a plurality of secondary frame members, each having a first end perpendicularly attached to a rear side of said main frame member;
   a block, having a bottom surface removably attached to said frame assembly, an upper surface, a front face, and a rear face; and,
   a step plate attached to said upper surface of said block;
   wherein each secondary frame member is adapted to be attached to said side of said vehicle;
   wherein said block bottom surface is attached to top surfaces of at least one of said plurality of secondary frame members; and,
   wherein a front face of said main frame member has a profile matching that of said block front face, each comprising a linear portion and a pair of distal portions, each distal portion deflecting rearwardly away from a respective side of said linear portion at an angle.

9. The step of claim 8, wherein said block is composed of a hardwood.

10. The step of claim 8, wherein said angle is forty-five degrees.

11. The step of claim 8, wherein said block is composed of a hardwood.

12. The step of claim 8, wherein said step plate is a diamond plate or a four-way safety plate.

13. The step of claim 8, wherein said step plate is configured to generally match a profile of said block upper surface.

14. The step of claim 13, wherein said step plate is a diamond plate or a four-way safety plate.

* * * * *